United States Patent [19]

O'Brien et al.

[11] Patent Number: 5,176,002

[45] Date of Patent: Jan. 5, 1993

[54] METHOD OF CONTROLLING VAPOR LOSS FROM CONTAINERS OF VOLATILE CHEMICALS

[75] Inventors: John V. O'Brien, Shrewsbury; Robert A. Wojnarowski, Andover, both of Mass.

[73] Assignee: Process Systems International, Inc., Westborough, Mass.

[21] Appl. No.: 683,252

[22] Filed: Apr. 10, 1991

[51] Int. Cl.$^5$ .............................................. F17C 3/10
[52] U.S. Cl. ........................................ 62/48.2; 62/11; 220/88.3
[58] Field of Search .................. 62/11, 48.2; 220/88.3

[56] References Cited

U.S. PATENT DOCUMENTS

| | | |
|---|---|---|
| 3,714,790 | 2/1973 | Battey . |
| 3,768,271 | 10/1973 | Denis ..................... 220/88.3 X |
| 3,830,040 | 8/1974 | Hendrix ..................... 62/48.2 X |
| 3,886,596 | 6/1975 | McNamee . |
| 3,945,214 | 3/1976 | Darredeau et al. ........... 62/48.2 |
| 3,967,938 | 7/1976 | Daeschler et al. . |
| 4,027,495 | 6/1977 | Edwards . |
| 4,066,423 | 1/1978 | McGill et al. . |
| 4,110,091 | 8/1978 | Daeschler et al. . |
| 4,188,793 | 2/1980 | Watson et al. ............ 62/48.2 |
| 4,249,387 | 2/1981 | Crowley ................. 62/48.2 |
| 4,276,749 | 7/1981 | Crowley ................. 62/48.2 |
| 4,350,018 | 9/1982 | Frank et al. .......... 220/88.3 X |
| 4,727,723 | 3/1988 | Durr . |

FOREIGN PATENT DOCUMENTS

| | | |
|---|---|---|
| 605490 | 9/1960 | Canada ........................ 220/88.3 |
| 39277 | 3/1977 | Japan .......................... 62/48.2 |
| 1191779 | 5/1970 | United Kingdom ......... 62/48.2 |
| 2098874 | 12/1982 | United Kingdom ......... 62/48.2 |

OTHER PUBLICATIONS

"Can Pyrophoric Materials Form in Oil Tankers with Inert Gas Fire Protection Systems?", W. A. Affens, Dec. 1977, pp. 1,2.

Primary Examiner—Henry A. Bennet
Assistant Examiner—Christopher B. Kilner
Attorney, Agent, or Firm—Shook, Hardy & Bacon

[57] ABSTRACT

A substantially closed vapor control system is provided for recovering volatilized vapors released during the filling of storage and other types of tanks with hydrocarbons or other volatile chemicals. An inert gas is supplied to the tank and mixes with the volatilized vapors during loading of the hydrocarbon or chemical to produce an inflammable vapor mixture. The vapor mixture is then subjected to a two-stage compression and separation process to condense and separate the volatilized vapors from the inert gas. The condensed volatilized vapor is then returned to the storage tank while the inert gas is liquefied and stored for subsequent delivery to the storage tank when the hydrocarbon or chemical is unloaded from the tank.

13 Claims, 2 Drawing Sheets

METHOD OF CONTROLLING VAPOR LOSS FROM CONTAINERS OF VOLATILE CHEMICALS

BACKGROUND OF THE INVENTION

This invention relates to a method for the recovery of vapors of liquid hydrocarbons or other chemicals, and more particularly to the recovery of vapors which are displaced from tanks during the filling of the tank with liquid hydrocarbons or other chemicals.

As liquid hydrocarbons or other volatile chemicals are loaded into storage tanks such as on ships, trucks or railroad cars, a portion of the hydrocarbon or chemical enters the vapor phase and mixes with air and other vapors present in the tank. The vapor mixture is then expelled from the tank as the liquid level in the tank rises. Although the separation and recovery of the hydrocarbon or other chemical from the vapor mixture is often economically unfeasible because of the high equipment and operating costs of conventional recovery processes, the expelled vapor is a significant contributor to air pollution and federal legislation has been enacted which strictly limits the release of such vapors.

Previous attempts to recover hydrocarbon vapors displaced during the filing of storage tanks have utilized large condensation or absorption columns in combination with compressors and/or other apparatus to recover the hydrocarbon vapor as a liquid. Examples of such processes are disclosed in U.S. Pat. Nos. 3,967,938, 4,110,091, 3,886,759, and 3,714,790.

Another type of system for controlling hydrocarbon and other emissions during filling of storage tanks utilizes activated carbon or other solid adsorbent beds which selectively adsorb the hydrocarbon vapors from the displaced vapor stream. The adsorbent bed is regenerated such as by a reduction in pressure to desorb the hydrocarbon from the activated carbon. The hydrocarbon stream is then combusted or further processed in an absorption tower to recover a portion of the hydrocarbon as a liquid. An example of such a system is disclosed in U.S. Pat. No. 4,066,423.

In the vapor handling systems described above, the presence of air in the incoming vapor mixture presents a significant risk of combustion of the hydrocarbon vapor. To reduce the risk of combustion, a liquid hydrocarbon stream is often provided to saturate the vapor mixture. Specialized equipment such as flame arrestors and liquid ring pumps may also be utilized in an attempt to reduce the risk of fires or explosion. Water vapor in the incoming vapor mixture likewise presents considerable processing difficulties as the low temperatures required to separate the hydrocarbon from the mixture leads to freezing of the water vapor on system components such as heat exchanger tubes. The entire system must be frequently be shut down or backup equipment provided so that the frozen water may be periodically removed from such surfaces in order to maintain operability of the system. Yet, despite the high energy and specialized equipment requirements of such vapor control systems, a vapor overhead containing up to 10% hydrocarbon vapor may still be released to the atmosphere from the condensation tower overhead of at least one such system.

Vapor control systems such as those described above can be installed at loading terminals and connected to the tanks being loaded by a series of connecting pipes and blowers which direct the vapors from the tanks to the vapor control system. Because of the high equipment and operating cost for such systems, a single vapor control system is typically utilized for controlling vapors from a plurality of loading tanks. The use of a single system for multiple loading tanks, however, presents a difficult engineering problem since the quantity of vapor handled by the system will vary widely depending upon the number of tanks being filled at a given moment. In addition, the piping used to connect the vapor control system with the loading tanks is a potential source of leakage and resulting fire or explosion, particularly at marine terminals where the ship or barge may move in the water and disrupt the connecting vapor control pipes.

Inert gases have also been used in an attempt to reduce the risk of fire or explosion from hydrocarbon vapor emissions during loading operations. In one process, a flue gas comprising principally carbon dioxide, nitrogen and water vapor is introduced into the loading tank and mixed with the hydrocarbon vapors to provide an inert vapor mixture which is then vented directly to the atmosphere. While this type of vapor control system reduces the risk of fire or explosion, it was notably deficient in that the vented flue gas and hydrocarbon vapor mixture serve as a source of air pollution.

In another vapor control process, a nitrogen inerting gas is introduced into the holding tank of a barge or similar vessel to provide an inert vapor mixture in the vapor space above the hydrocarbon liquid during transport of the barge to its destination. During unloading of the hydrocarbon liquid from the barge, the nitrogen and hydrocarbon vapor mixture which has formed in the vapor space is directed onshore where the nitrogen vapor is separated from the vapor mixture and vented to the atmosphere. While this type of process is beneficial in view of the reduced risk of fire or explosion during transport and unloading of the barge, the inert gas is not recovered and a new source of nitrogen must be provided each time the barge is loaded.

SUMMARY OF THE INVENTION

It is an object of this invention to provide a vapor control system which may be utilized to recover displaced vapors during loading of volatile chemicals into storage or other types of tanks to prevent release of the vapors into the atmosphere and the pollution resulting therefrom.

It is also an object of this invention to provide a vapor recovery system for preventing flammable vapor mixtures from being formed during loading of volatile chemicals into containers so that the risk of fire or explosion is greatly reduced during recovery of the volatilized vapors.

It is another object of this invention to provide a vapor control system which does not require large condensation or absorption columns to recover the hydrocarbon so that the vapor control system may be readily installed on ships, barges and at other locations where the high profile of such columns makes their use generally unsuitable.

It is still another object of this invention to provide a vapor control system which may be positioned on a ship or barge so that the vapors which are displaced during filling of the loading tanks are recovered onboard the vessel to reduce the risk of fire and explosion which might occur if the vapors were directed through piping to a shore based control system.

It is a further object of this invention to provide a vapor control system which has a lower capital and operating cost than conventional vapor control systems so that the system may be dedicated to a single loading outlet to reduce the engineering difficulties encountered when a single vapor control system is utilized in connection with multiple loading outlets.

It is a still further object of this invention to provide a vapor recovery system which recovers substantially all of the vapors displaced during loading of volatile chemicals to reduce the economic loss which would result from failure to recover the chemical vapors.

It is yet another object of this invention to provide a vapor control and recovery system which operates in a substantially closed cycle to prevent entry of water into the system so that system components such as heat exchangers are not fouled by frozen water as typically occurs with many conventional vapor control systems.

It is still a further object of this invention to provide a vapor control system which utilizes a recoverable inert gas to substantially reduce the risk of combustion of a vapor formed during loading operations so that the system may be operated without the use of enrichment techniques or special handling equipment such as flame arrestors which significantly add to the capital and operating costs of conventional systems.

To accomplish these and other related objects of the invention, a process is provided for recovering vapors from a volatile liquid during loading of the liquid into a tank, said process comprising the steps of:

(a) providing an inert gas in the tank;
(b) removing from the tank a vapor stream comprising a mixture of the inert gas and the volatile liquid vapors;
(c) processing said removed vapor stream to separate said volatile liquid vapors from said inert gas; and
(d) recovering the inert gas.

The volatile liquid vapors which are separated from the vapor stream that is removed from the tank may be returned to the tank or other storage tanks as a liquid. The inert gas which is separated from the vapor stream is preferably liquefied and stored for subsequent recycling as a vapor to the tank, such as when the volatile liquid is unloaded from the tank. A substantially closed operational cycle is thus provided which recovers substantially all of the volatile liquid vapors while preventing the formation of flammable mixtures and entry of air and water vapor into the cycle.

BRIEF DESCRIPTION OF THE DRAWINGS

In the accompanying drawings which form a part of the specification and are to be read in conjunction therewith.

DESCRIPTION OF THE PREFERRED EMBODIMENTS

Figure 1:
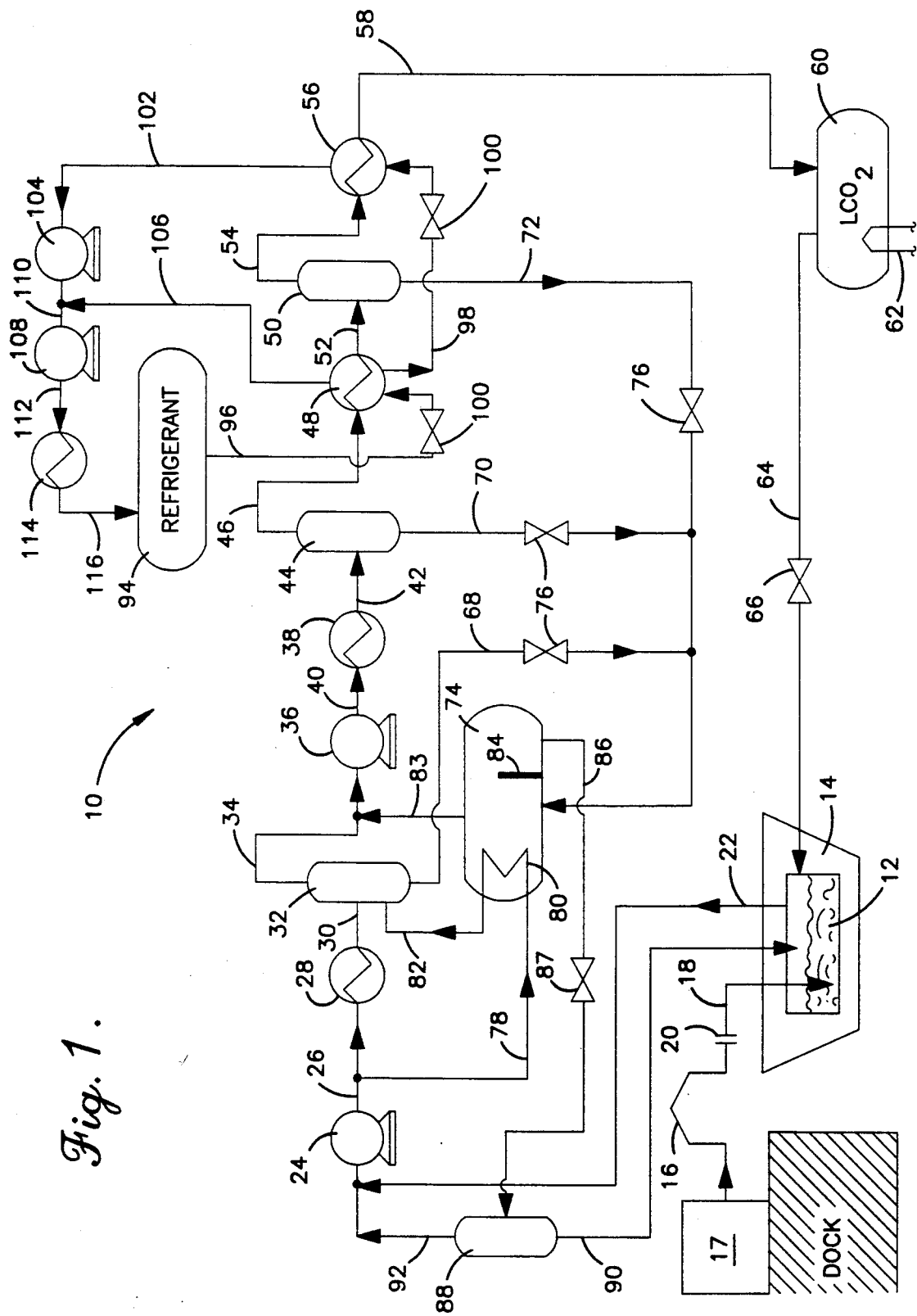
FIG. 1 is a schematic representation of a first embodiment of a vapor control system of the present invention particularly suited for recovering gasoline vapors during loading of gasoline into a ship's holding tank.

Referring now to the drawings in greater detail, and initially to FIG. 1, a vapor control system adapted for the recovery of volatilized components of hydrocarbons or other chemicals during loading operations is represented by the numeral 10. As illustrated, vapor control system 10 is particularly suited for recovering vapors expelled during loading of gasoline into a holding tank 12 on a barge or ship 14.

A loading arm 16 delivers the gasoline or other hydrocarbon stream from a storage tank 17 located onshore to a shipboard loading line 18 which directs the stream to the bottom of tank 12. A suitable manifold 20 is provided to connect loading line 18 with arm 16.

The vapor control system 10 is positioned on ship 14 and includes a vapor line 22 which directs vapors displaced during filling of tank 12 to a first stage compressor 24. A compressor discharge line 26 directs the pressurized vapor to a cooler 28 where the vapor is cooled by heat exchange with a suitable fluid such as air or water from a shipboard cooling water system.

Following compression and cooling in the first stage compressor 24 and cooler 28, the vapor stream is directed through line 30 to a separator 32 where the liquid components are separated from the vapor. A vapor overhead is directed from the separator through line 34 to a second stage compressor 36 and then to a second stage cooler 38 through line 40. The discharge from the second stage compression and cooling is directed through line 42 to another separator 44 to separate the vapor and liquid components.

The vapor overhead from second stage separator 44 is removed through line 46 and is directed to a first stage heat exchanger or chiller 48 to condense a portion of the vapor stream. The vapor stream is then directed to separator 50 through line 52 for removal of the condensed liquid portion of the vapor stream. The separator overhead is directed through line 54 to a second stage chiller 56 to fully condense the vapor stream. The liquefied stream is then directed through line 58 to a storage tank or accumulator 60.

A heating coil 62 is provided in accumulator 60 to revaporize the liquid stored therein for subsequent delivery of the vapor through line 64 to the ship's holding tank 12. A suitable valve 66 is provided in line 64 to regulate flow therein.

The liquid knock down from separators 32, 44, and 50 is directed through effluent lines 68, 70, and 72 associated with the respective separators to a kettle type heat exchanging drum 74. Suitable valves 76 are provided to regulate flow within the separator effluent lines.

Kettle drum 74 operates at a pressure generally corresponding to that of separator 32 to boil off a vapor fraction from the liquid effluent of separators 32, 44 and 50. Kettle drum 74 is heated by a hot fluid stream 78 taken from the first stage compressor 24 discharge, although other suitable sources of heat exchanging fluid may be provided. Stream 78 is directed through a U-tube heat exchanger 80 provided within drum 74 and is then removed from the drum through line 82 and directed to the first stage separator 32. A vapor overhead from the drum 74 is withdrawn through line 83 and directed to the inlet of second stage compressor 36.

A weir 84 is provided in the kettle drum 74 and liquid which spills over the weir is directed through a discharge line 86 containing valve 87 to a flash separator 88 where a vapor is separated from the liquid stream. A liquid bottoms is directed from flash separator 88 through line 90 and returned to the ship holding tank 12. A vapor overhead from the separator is directed through line 92 to the first stage compressor 24.

Heat exchange chillers 48 and 56 are cooled by a suitable refrigerant such as ammonia, freon, or propane supplied from an accumulator 94. The refrigerant is directed from accumulator 94 through line 96 to the first stage chiller 48 where it is let down in pressure and partially vaporized to supply the necessary cooling. A portion of the refrigerant is directed from first stage chiller 48 through line 98 to the second stage chiller 56 where it is further reduced in pressure and further vaporized to provide additional cooling. Valves 100 are provided in lines 96 and 98 to control flow of the refrigerant through those lines.

A refrigerant overhead is directed through line 102 from the second stage chiller 56 to a first stage compressor 104 where it is pressurized to an intermediate pressure. An overhead 106 is likewise removed from first stage chiller 48 and directed into a second stage compressor 108 along with the discharge 110 from the first stage compressor 104. A vapor stream 112 discharged from compressor 108 is condensed in heat exchanger 114 and returned to accumulator 94 through line 116.

In operation, vapor control system 10 permits the recovery of the volatilized light end components of the gasoline or other hydrocarbon or chemical stream during loading of the stream into ship holding tank 12. In addition to providing for recovery of the displaced vapors, the vapor control system utilizes an inerting gas to prevent fires or explosions as a result of combustion of the vapors. Advantageously, the entire vapor control system is positioned on board the ship 14 and operates in a closed manner to recover the displaced vapors and the inerting gas without the problems associated with the presence of air and moisture in the system and without the use of large distillation columns or other apparatus which are generally unsuited for shipboard usage.

The inerting gas is preferably $CO_2$ because it may readily be liquefied for storage. Liquid $CO_2$ is maintained in accumulator 60 and is vaporized by heating coil 62 for delivery as a gas through line 64 to the ship holding tank 12. The $CO_2$ gas is initially introduced into the gasoline holding tank 12 in a suitable manner to displace the air and water vapor within the tank before loading operations begin. Alternatively, the $CO_2$ gas may be introduced into tank 12 as the liquid within the tank is unloaded. Once the vapor space within the tank 12 is filled with inert $CO_2$ gas, gasoline is loaded into the tank from shore based tanks 15. Loading line 18 is preferably positioned to direct the gasoline to the bottom of the loading tank to reduce the amount of gasoline which is vaporized.

As the gasoline is loaded into tank 12, a portion of the volatile, light end components of the gasoline enter the vapor phase and mix with the $CO_2$ gas to create an inert vapor mixture. As the liquid level rises within tank 12, the vapor mixture is displaced from the tank 12 through vapor line 22 for subsequent processing to separate and recover the gasoline vapors and the inerting gas as liquids. The recovered gasoline is then returned to tank 12 and the recovered inerting gas is likewise returned as a liquid to accumulator 60 for storage and subsequent use.

The vapor stream displaced from holding tank 12 is directed initially to the first stage compressor 24 and cooler 28 which operate to compress and then cool the vapor stream to partially liquefy the heavier, principally gasoline, portions thereof.

Following compression and cooling in first stage compressor 24 and cooler 28, the vapor stream is directed through line 30 to separator 32 where the condensed liquid gasoline is separated from the vapor stream and removed through line 68. The vapor overhead removed from separator 32 through line 34 still contains substantial amounts of gasoline vapors and is subjected to further compression and cooling in second stage compressor 36 and cooler 38. The vapor stream is then directed through line 42 to a second stage separator 44 where condensed liquid comprising gasoline and increased amounts of liquid $CO_2$ is again separated from the vapor stream.

The vapor stream removed from second stage separator 44 through overhead line 46 has been stripped of much of the gasoline vapors. All but a small portion of the gasoline vapors remaining in the vapor stream are removed in first stage chiller 48 where the gasoline vapors and a portion of the $CO_2$ gas are liquefied and then separated in separator 50. The vapor overhead from separator 50 is then liquefied in chiller 56 and returned as liquid $CO_2$ to storage accumulator 60. The purity of the $CO_2$ stream 58 may range between 90-99% or greater, but need not be exceedingly high since the $CO_2$ is recycled to tank 12 during unloading of the gasoline in the tank. Recovery of the inert gas and storage thereof as a liquid is particularly advantageous in that the liquid inert gas ma be subsequently vaporized and returned to the gasoline holding tank 12 during unloading of the gasoline to maintain an inert atmosphere therein. The selection of $CO_2$ as the inert gas is particularly suited for this purpose as it may be readily liquefied for storage in a tank 60 which is much smaller than the massive storage tank which would be required to hold the same molar quantity of $CO_2$ in the gas phase.

The gasoline vapor which has been stripped from the vapor stream as liquid bottoms is further processed before being returned to tank 12 to remove liquid $CO_2$ which is mixed with the liquid gasoline. The liquid bottoms from separators 32, 44, and 50 are directed through lines 68, 70 and 72 to kettle drum 74 where they are heated at a reduced pressure to vaporize the $CO_2$. A portion of compressor 24 discharge is directed through line 78 to provide the heat exchanging fluid for operation of kettle drum 74. The vapor overhead is removed from drum 74 and directed to the second stage compressor 36 for further processing to remove the vaporized gasoline present in the overhead. Liquid which flows over the weir 84 within the drum and is removed through line 86 may comprise up to or greater than 99% gasoline. Most of the liquid $CO_2$ remaining in that liquid is flashed off in separator 88. The bottoms from the separator contains substantially pure gasoline which is then returned to tank 12 through line 90 It can thus be seen that substantially all of the gasoline vapor which was initially displaced from tank 12 can be recovered and returned to the tank as a liquid with only very minor amounts of the inert gas being present therein, i.e. on the order of 0.1% $CO_2$.

In general, the vapor control system 10 may be shut down after the ship's tank 12 has been loaded and the displaced vapors have been recovered. When the ship 14 reaches its destination and the gasoline in tank 12 is unloaded therefrom, the heating coil 62 in accumulator 60 is activated to vaporize the liquid $CO_2$. The $CO_2$ is then returned through line 64 to fill the vapor space created by removal of the gasoline, thereby maintaining an inert environment in the tank and preventing entry of air, water and other vapors into the tank. The vapor control system 10 thus provides a substantially closed system which eliminates the processing difficulties and safety hazards resulting from mixing air and water vapor with the gasoline vapors.

It can also be seen that vapor control system 10 provides for substantially total recovery of the gasoline vapors which are displaced during the loading of holding tank 12. Yet, the recovered gasoline is obtained without the use of large condensation or absorption towers which, because of their height, would be generally unsuitable for ships or barges which must maintain a low profile to pass under bridges and other obstacles. Placement of the vapor control system 10 directly on the ship also reduces the risk of fire and explosion which might result from directing the displaced vapors to a shore based system through pipes which might be subject to leakage.

Figure 2:
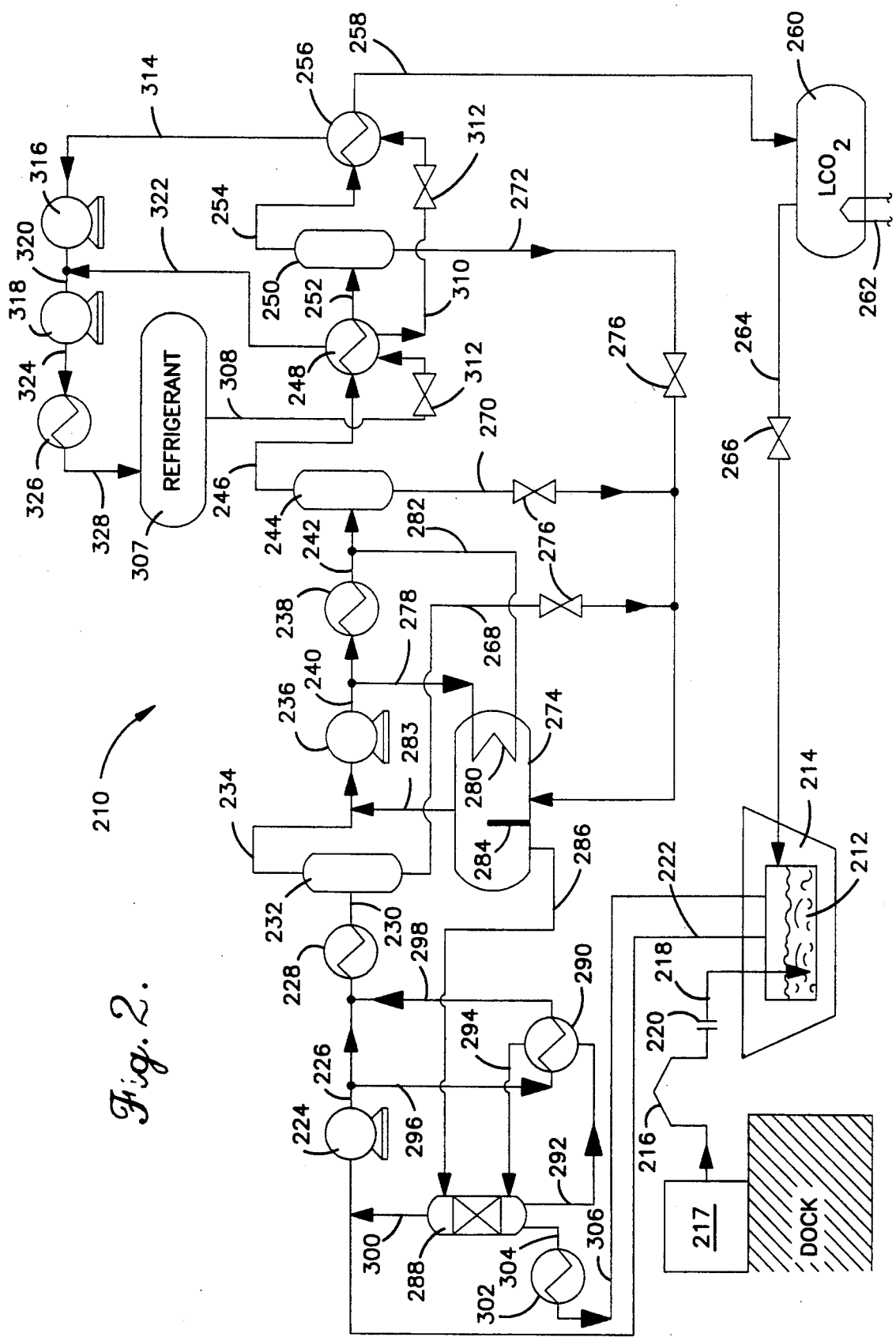
FIG. 2 is a schematic representation of a second embodiment of a vapor control system particularly suited for recovering benzene vapors during loading of benzene into a ship's holding tank.

Turning to FIG. 2, another embodiment of the vapor control system particularly suited for recovery of benzene vapors during the loading operations is represented broadly by the numeral 210. A holding tank 212 is provided on ship 214 for storing the benzene for subsequent delivery to another location. A loading arm 216 delivers the benzene from a shore based storage tank 217 to a shipboard loading line 218 which is connected by a suitable manifold 220 to loading arm 216.

A mixture of benzene vapors and an inerting gas is formed in the holding tank 212 during loading of the benzene into the tank. As the benzene liquid level rises within the tank, the vapor mixture is displaced from the tank and directed through vapor line 222 to a first stage compressor 224 and then through line 226 to a first stage cooler 228. The discharge from cooler 228 is directed through line 230 to a first stage separator 232 where the condensed liquid is removed from the vapor stream.

A vapor overhead from first stage separator 232 is directed through line 234 to a second stage compressor 236 and then to a second stage cooler 238 through line 240. The discharge from cooler 238 is directed through line 242 to a second stage separator 244 for separation of the condensed liquid from the vapor stream.

A vapor overhead is removed from the second stage separator 244 through line 246 and is directed to a first stage chiller 248 to condense a portion of the vapor stream. The chilled vapor stream is directed to a separator 250 through line 252 for separation of the liquid components in the vapor stream. The vapor stream is removed from separator 250 through an overhead line 254 and is directed to a second stage chiller 256. The discharge from chiller 256 is directed through 258 to an accumulator 260. A heating coil 262 is provided in accumulator 260 and a flow line 264 leads from the accumulator to the ship holding tank to 212. A suitable valve 266 is provided in flow line 264.

Separators 232, 244, and 250 are each provided with an associated liquid knock down line 268, 270, and 272 which directs the liquid from the separators to a kettle drum 274. Suitable valves 276 are provided in the liquid knock down lines 268, 270, and 272. The liquid directed to kettle drum 274 is heated by a portion of the second stage compressor 236 discharge which is delivered to the kettle drum through line 278. The heat exchanging fluid in line 278 flows through a heating coil 280 within the kettle drum and is returned to the second stage separator 244 through line 282. A vapor overhead is directed from the kettle 274 to the second stage compressor 236 through line 283.

Liquid which spills over a weir 284 provided within kettle drum 274 flows through line 286 to an upper zone of a small packed column 288. A reboiler 290 heats a liquid bottoms taken from column 288 through line 292 and returns it as a vapor through line 294 into a lower zone of the tower. Heating within reboiler 290 is provided by a portion of the first stage compressor 224 discharge which is directed through line 296 to the reboiler and returned to the first stage cooler 228 through line 298.

A vapor overhead is removed from column 288 through line 300 and is directed to the first stage compressor 224. A liquid bottoms is removed from the column and directed to a cooler 302 through line 304. The cooler discharge is then returned to the ship holding tank 212 through line 306.

Cooling in first and second stage chillers 248 and 256 is provided by a refrigerant maintained in an accumulator 307. The refrigerant is directed through line 308 to the first stage chiller 248 where it is let down in pressure. The refrigerant is then directed from the first stage cooler to second stage cooler 256 through line 310. Valves 312 are provided within lines 308 and 310. The refrigerant is directed from the second stage chiller through line 314 to a first stage compressor 316. The discharge from the first stage compressor is directed to a second stage compressor 318 through line 320. A portion of the refrigerant in first stage chiller 248 is also directed to the second stage compressor 18 through line 322. The compressed discharge from second stage compressor 318 is directed through line 324 to a condenser 326 and then returned to accumulator 306 through line 328

Vapor control system 210 is particularly suited for recovery of benzene vapors and may be operated in a manner similar to operation of system 10 previously described. System 210, however, has been modified from the gasoline vapor recovery system 10 because benzene has a higher freezing point and higher purity requirements than gasoline. In addition, the loading rates for benzene are typically on the order of 1,000-2,000 BPH as contrasted with rates of 10,000-30,000 BPH for gasoline.

An inert atmosphere is provided in benzene holding tank 212 by directing the $CO_2$ inert gas to the tank either prior to or during filling of the tank with benzene. The $CO_2$-benzene vapor mixture is withdrawn from tank 212 through line 222 and subjected to first stage compression, cooling and separation in compressor 224, cooler 228 and separator 232. The vapor overhead is taken from separator 232 through line 234 and subjected to further compression, cooling and separation in second stage condenser 236, cooler 238 and separator 244. The vapor overhead is then run through chiller 248 and separator 250 where the condensed liquid is removed, leaving a $CO_2$ vapor stream having a purity which may reach or exceed 99.5%. The $CO_2$ vapor stream is liquefied in second stage chiller 256 and directed to accumulator 260 through line 258.

The liquid bottoms removed from separators 232, 244, and 250 through lines 268, 270 and 272 are directed to kettle 274 where the $CO_2$ is boiled off from the benzene liquid. Because benzene has a freezing point of approximately 42° F., sufficient heat must be supplied to the kettle to ensure that the benzene does not solidify. Consequently, the kettle is heated by a portion of the discharge from second stage compressor 236 which is at a higher temperature than the first stage compressor 224 discharge. The liquid which flows over weir 284 in kettle 274 is principally benzene but because of the high purity requirements for benzene the residual $CO_2$ must be removed from the benzene The liquid is thus directed to the small column 288 where the $CO_2$ is stripped from the liquid to provide a benzene stream having the purity desired, typically with the $CO_2$ concentration being on the order of 100 ppm. Again, because of the relatively high freezing point of benzene, the reboiler 290 must supply sufficient heat to the column and the final chilldown temperature of the benzene stream which is removed from the column and directed through cooler 302 should be maintained above approximately 45° F. The cooled benzene liquid is then returned to tank 212 through line 306. The overhead from the column 288 is removed through line 300 for further processing.

When recovery of the benzene vapors is complete, the system 210 may be shut down until the ship 214 arrives at its destination. The liquid $CO_2$ is then vaporized by heating coil 262 and returned to the tank 212 through line 264 to provide an inert atmosphere within the tank as the benzene is unloaded therefrom.

It can thus be seen that vapor control system 210 provides for the substantially complete recovery of benzene vapors in a manner similar to that achieved for gasoline vapors utilizing system 10 previously described. The advantageous provided by system 10 are likewise attendant with system 210. It will also be appreciated that the vapor control system exemplified for gasoline and benzene loading may be readily adapted for use with loading and unloading of other volatile chemicals such as other aromatics as well as other compositions such as crude oil.

The vapor control systems 10 and 210 illustrated in FIGS. 1 and 2, respectively are further exemplified in the following examples in which operation of the systems was simulated using the "PD+Plus" Profession Distillation computer program available from Deerhaven Technical Software.

EXAMPLE 1—GASOLINE LOADING

The gasoline loading was simulated at a flow rate of 10,000 BPH with gasoline characterized as having a Reid Vapor Pressure and a D86 distillation curve. The gasoline was further simulated as a combination of fourteen pseudocomponents with the associated boiling point ranges and mole and weight fractions for each being set forth below in Gasoline Stream 18.

Equipment operating specifications and conditions:
HOLDING TANK 12
TEMPERATURE = 100.0 F, PRESSURE = 14.70 PSIA
FIRST STAGE COMPRESSOR 24
GAS HORSEPOWER = 131.1
POLYTROPIC EFFICIENCY = 75.0%
INLET VOLUME = 1021.3 CFM
INLET CONDITIONS

| STAGE | TEMP (F) | PRES (PSIA) |
|---|---|---|
| 1 | 97.6 | 14.70 |

OUTLET CONDITIONS

| TEMP (F) | PRES (PSIA) |
|---|---|
| 204.8 | 58.80 |

FIRST STAGE COOLER 32
TEMPERATURE = 125.0 F, PRESSURE = 55.00 PSIA
MOL FRACTION LIQUID = 0.09727
HEAT REMOVED = 0.432 MM BTU/HR
SECOND STAGE COMPRESSOR 36
GAS HORSEPOWER = 139.3
POLYTROPIC EFFICIENCY = 75.0%
INLET VOLUME = 304.4 CFM
INLET CONDITIONS

| STAGE | TEMP (F) | PRES (PSIA) |
|---|---|---|
| 1 | 125.0 | 55.00 |

OUTLET CONDITIONS

| TEMP (F) | PRES (PSIA) |
|---|---|
| 240.7 | 210.00 |

SECOND STAGE COOLER 38
TEMPERATURE = 125.0 F, PRESSURE = 207.00 PSIA
MOL FRACTION LIQUID = 0.36946
HEAT REMOVED = 0.966 MM BTU/HR
FIRST STAGE CHILLER 48
TEMPERATURE = 20.0 F, PRESSURE = 204.00 PSIA
MOL FRACTION LIQUID = 0.22331
HEAT REMOVED = 0.353 MM BTU/HR
KETTLE DRUM 74
TEMPERATURE = 125.0 F, PRESSURE = 55.00 PSIA
MOL FRACTION LIQUID = 0,71173
HEAT ADDED = 0.293 MM BTU/HR
FLASH SEPARATOR 88
TEMPERATURE = 79.7 F, PRESSURE = 14.70 PSIA
MOL FRACTION LIQUID = 0.81461
HEAT ADDED = 0.0 BTU/HR
SECOND STAGE CHILLER 56
TEMPERATURE = −22.4 F, PRESSURE = 200.00 PSIA
MOL FRACTION LIQUID = 1.00000
HEAT REMOVED = 0.521 MM BTU/HR

Liquid/vapor stream conditions and compositions:
GASOLINE STREAM 18 COMPOSITION

| | | MOL FR. |
|---|---|---|
| 2 BP | 14–125 F | 0.4597 |
| 3 BP | 125–150 F | 0.0817 |
| 4 BP | 150–175 F | 0.0720 |
| 5 BP | 175–200 F | 0.0630 |
| 6 BP | 200–225 F | 0.0539 |
| 7 BP | 225–250 F | 0.0476 |
| 8 BP | 250–275 F | 0.0445 |
| 9 BP | 275–300 F | 0.0379 |
| 10 BP | 300–325 F | 0.0330 |
| 11 BP | 325–350 F | 0.0292 |
| 12 BP | 350–375 F | 0.0260 |
| 13 BP | 375–400 F | 0.0234 |
| 14 BP | 400–425 F | 0.0212 |
| 15 BP | 425–434 F | 0.700E-02 |

TEMPERATURE 100.0 F        PRESSURE 14.70 PSIA
FLOW 10,000 BPH
VAPOR STREAM 22

| | | LBMOL/HR | MOL FR. |
|---|---|---|---|
| 1 $CO_2$ | | 79.596 | 0.5707 |
| 2 BP | 14–125 F | 44.612 | 0.3199 |
| 3 BP | 125–150 F | 5.558 | 0.0399 |
| 4 BP | 150–175 F | 3.852 | 0.0276 |
| 5 BP | 175–200 F | 2.502 | 0.0179 |
| 6 BP | 200–225 F | 1.485 | 0.0106 |
| 7 BP | 225–250 F | 0.858 | 0.615E-02 |
| 8 BP | 250–275 F | 0.503 | 0.360E-02 |
| 9 BP | 275–300 F | 0.256 | 0.183E-02 |
| 10 BP | 300–325 F | 0.129 | 0.922E-03 |
| 11 BP | 325–350 F | 0.063 | 0.455E-03 |
| 12 BP | 350–375 F | 0.031 | 0.220E-03 |
| 13 BP | 375–400 F | 0.015 | 0.104E-03 |
| 14 BP | 400–425 F | 0.007 | 0.484E-04 |
| 15 BP | 425–434 F | 0.001 | 0.100E-04 |
| | | 139.467 | |

TEMPERATURE 100.0 F        PRESSURE 14.70 PSIA
AVERAGE MOL. WT. 62.75
VOLUME 938.25 CFM
VAPOR STREAM 92

| | | LBMOL/HR | MOL FR. |
|---|---|---|---|
| 1 $CO_2$ | | 0.984 | 0.0747 |
| 2 BP | 14–125 F | 11.394 | 0.8649 |
| 3 BP | 125–150 F | 0.473 | 0.0359 |
| 4 BP | 150–175 F | 0.201 | 0.0152 |
| 5 BP | 175–200 F | 0.079 | 0.603E-02 |
| 6 BP | 200–225 F | 0.028 | 0.212E-02 |
| 7 BP | 225–250 F | 0.009 | 0.716E-03 |
| 8 BP | 250–275 F | 0.003 | 0.242E-03 |
| 9 BP | 275–300 F | 0.001 | 0.690E-04 |
| 10 BP | 300–325 F | 0.000 | 0.191E-04 |
| 11 BP | 325–350 F | 0.000 | 0.507E-05 |
| 12 BP | 350–375 F | 0.000 | 0.129E-05 |
| 13 BP | 375–400 F | 0.000 | 0.313E-06 |

-continued

| | | LBMOL/HR | MOL FR. |
|---|---|---|---|
| 14 BP | 400-425 F | 0.000 | 0.726E-07 |
| 15 BP | 425-434 F | 0.000 | 0.922E-08 |
| | | 13.173 | |

TEMPERATURE 79.7 F  PRESSURE 14.70 PSIA
AVERAGE MOL. WT. 80.39
VOLUME 84.07 CFM
STREAM 26

| | | LBMOL/HR | MOL FR. |
|---|---|---|---|
| 1 $CO_2$ | | 80.581 | 0.5279 |
| 2 BP | 14-125 F | 56.002 | 0.3669 |
| 3 BP | 125-150 F | 6.030 | 0.0395 |
| 4 BP | 150-175 F | 4.053 | 0.0266 |
| 5 BP | 175-200 F | 2.582 | 0.0169 |
| 6 BP | 200-225 F | 1.513 | 0.991E-02 |
| 7 BP | 225-250 F | 0.867 | 0.568E-02 |
| 8 BP | 250-275 F | 0.506 | 0.331E-02 |
| 9 BP | 275-300 F | 0.257 | 0.168E-02 |
| 10 BP | 300-325 F | 0.129 | 0.844E-03 |
| 11 BP | 325-350 F | 0.064 | 0.416E-03 |
| 12 BP | 350-375 F | 0.031 | 0.201E-03 |
| 13 BP | 375-400 F | 0.015 | 0.953E-04 |
| 14 BP | 400-425 F | 0.007 | 0.442E-04 |
| 15 BP | 425-434 F | 0.001 | 0.914E-05 |
| | | 152.636 | |

TEMPERATURE 204.8 F  PRESSURE 58.80 PSIA
AVERAGE MOL. WT. 64.27
VOLUME 298.85 CFM
VAPOR STREAM 34

| | | LBMOL/HR | MOL FR. |
|---|---|---|---|
| 1 $CO_2$ | | 80.281 | 0.5826 |
| 2 BP | 14-125 F | 48.506 | 0.3520 |
| 3 BP | 125-150 F | 4.251 | 0.0309 |
| 4 BP | 150-175 F | 2.467 | 0.0179 |
| 5 BP | 175-200 F | 1.296 | 0.941E-02 |
| 6 BP | 200-225 F | 0.590 | 0.428E-02 |
| 7 BP | 225-250 F | 0.248 | 0.180E-02 |
| 8 BP | 250-275 F | 0.100 | 0.728E-03 |
| 9 BP | 275-300 F | 0.033 | 0.242E-03 |
| 10 BP | 300-325 F | 0.011 | 0.762E-04 |
| 11 BP | 325-350 F | 0.003 | 0.227E-04 |
| 12 BP | 350-375 F | 0.001 | 0.638E-05 |
| 13 BP | 375-400 F | 0.000 | 0.171E-05 |
| 14 BP | 400-425 F | 0.000 | 0.438E-06 |
| 15 BP | 425-434 F | 0.000 | 0.594E-07 |
| | | 137.788 | |

TEMPERATURE 125.0 F  PRESSURE 55.00 PSIA
FRACTION LIQUID 0.0000
AVERAGE MOL. WT. 61.16
VOLUME 252.26 CFM
LIQUID STREAM 68

| | | LBMOL/HR | MOL FR. |
|---|---|---|---|
| 1 $CO_2$ | | 0.300 | 0.0202 |
| 2 BP | 14-125 F | 7.496 | 0.5049 |
| 3 BP | 125-150 F | 1.779 | 0.1198 |
| 4 BP | 150-175 F | 1.586 | 0.1068 |
| 5 BP | 175-200 F | 1.285 | 0.0866 |
| 6 BP | 200-225 F | 0.922 | 0.0621 |
| 7 BP | 225-250 F | 0.620 | 0.0417 |
| 8 BP | 250-275 F | 0.406 | 0.0273 |
| 9 BP | 275-300 F | 0.233 | 0.0150 |
| 10 BP | 300-325 F | 0.118 | 0.797E-02 |
| 11 BP | 325-350 F | 0.060 | 0.407E-02 |
| 12 BP | 350-375 F | 0.030 | 0.201E-02 |
| 13 BP | 375-400 F | 0.014 | 0.964E-03 |
| 14 BP | 400-425 F | 0.007 | 0.451E-03 |
| 15 BP | 425-434 F | 0.001 | 0.934E-04 |
| | | 14.847 | |

TEMPERATURE 125.0 F  PRESSURE 55.00 PSIA
FRACTION LIQUID 1.0000
AVERAGE MOL. WT. 93.21
VOLUME 4.06 GAL/MIN  SP. GRAVITY 0.6823 (125.0 F)
VAPOR STREAM 83

| | | LBMOL/HR | MOL FR. |
|---|---|---|---|
| 1 $CO_2$ | | 12.387 | 0.4304 |
| 2 BP | 14-125 F | 15.298 | 0.5316 |
| 3 BP | 125-150 F | 0.634 | 0.0220 |
| 4 BP | 150-175 F | 0.279 | 0.969E-02 |
| 5 BP | 175-200 F | 0.116 | 0.4.2E-02 |
| 6 BP | 200-225 F | 0.043 | 0.150E-02 |
| 7 BP | 225-250 F | 0.016 | 0.540E-03 |
| 8 BP | 250-275 F | 0.006 | 0.196E-03 |
| 9 BP | 275-300 F | 0.002 | 0.602E-04 |
| 10 BP | 300-325 F | 0.001 | 0.180E-04 |
| 11 BP | 325-350 F | 0.000 | 0.522E-05 |
| 12 BP | 350-375 F | 0.000 | 0.144E-05 |
| 13 BP | 375-400 F | 0.000 | 0.385E-06 |
| 14 BP | 400-425 F | 0.000 | 0.983E-07 |
| 15 BP | 425-434 F | 0.000 | 0.134E-07 |
| | | 28.780 | |

TEMPERATURE 125.0 F  PRESSURE 55.00 PSIA
AVERAGE MOL. WT. 66.43
VOLUME 52.10 CF
STREAM 40

| | | LBMOL/HR | MOL FR. |
|---|---|---|---|
| 1 $CO_2$ | | 92.665 | 0.5563 |
| 2 BP | 14-125 F | 63.798 | 0.3830 |
| 3 BP | 125-150 F | 4.885 | 0.0293 |
| 4 BP | 150-175 F | 2.746 | 0.0165 |
| 5 BP | 175-200 F | 1.412 | 0.848E-02 |
| 6 BP | 200-225 F | 0.633 | 0.380E-02 |
| 7 BP | 225-250 F | 0.263 | 0.158E-02 |
| 8 BP | 250-275 F | 0.106 | 0.636E-03 |
| 9 BP | 275-300 F | 0.035 | 0.211E-03 |
| 10 BP | 300-325 F | 0.011 | 0.662E-04 |
| 11 BP | 325-350 F | 0.003 | 0.197E-04 |
| 12 BP | 350-375 F | 0.001 | 0.553E-05 |
| 13 BP | 375-400 F | 0.000 | 0.148E-05 |
| 14 BP | 400-424 F | 0.000 | 0.379E-06 |
| 15 BP | 425-434 F | 0.000 | 0.514E-07 |
| | | 166.559 | |

TEMPERATURE 240.7 F  PRESSURE 210.00 PSIA
AVERAGE MOL. WT. 62.07
VOLUME 90.73 CFM
VAPOR STREAM 46

| | | LBMOL/HR | MOL FR. |
|---|---|---|---|
| 1 $CO_2$ | | 86.311 | 0.8218 |
| 2 BP | 14-125 F | 17.701 | 0.1685 |
| 3 BP | 125-150 F | 0.638 | 0.607E-02 |
| 4 BP | 150-175 F | 0.250 | 0.238E-02 |
| 5 BP | 175-200 F | 0.088 | 0.839E-03 |
| 6 BP | 200-225 F | 0.026 | 0.251E-03 |
| 7 BP | 225-250 F | 0.007 | 0.681E-04 |
| 8 BP | 250-275 F | 0.002 | 0.176E-04 |
| 9 BP | 275-300 F | 0.000 | 0.365E-05 |
| 10 BP | 300-325 F | 0.000 | 0.707E-06 |
| 11 BP | 325-350 F | 0.000 | 0.127E-06 |
| 12 BP | 350-375 F | 0.000 | 0.211E-07 |
| 13 BP | 375-400 F | 0.000 | 0.329E-08 |
| 14 BP | 400-425 F | 0.000 | 0.477E-09 |
| 15 BP | 425-434 F | 0.000 | 0.434E-10 |
| | | 105.023 | |

TEMPERATURE 125.0 F  PRESSURE 207.00 PSIA
AVERAGE MOL. WT. 50.98
VOLUME 48.66 CFM
LIQUID STREAM 70

| | | LBMOL/HR | MOL FR. |
|---|---|---|---|
| 1 $CO_2$ | | 6.354 | 0.1033 |
| 2 BP | 14-135 F | 46.097 | 0.7491 |
| 3 BP | 125-150 F | 4.248 | 0.0690 |
| 4 BP | 150-175 F | 2.496 | 0.0406 |
| 5 BP | 175-200 F | 1.324 | 0.0215 |
| 6 BP | 200-225 F | 0.607 | 0.986E-02 |
| 7 BP | 225-250 F | 0.256 | 0.416E-02 |
| 8 BP | 250-275 F | 0.104 | 0.169E-02 |
| 9 BP | 275-300 F | 0.035 | 0.564E-03 |
| 10 BP | 300-325 F | 0.011 | 0.178E-03 |
| 11 BP | 325-350 F | 0.003 | 0.530E-04 |
| 12 BP | 350-375 F | 0.001 | 0.149E-04 |
| 13 BP | 375-400 F | 0.000 | 0.401E-05 |
| 14 BP | 400-425 F | 0.000 | 0.103E-05 |
| 15 BP | 425-434 F | 0.000 | 0.139E-06 |
| | | 61.536 | |

TEMPERATURE 125.0 F  PRESSURE 207.00 PSIA
AVERAGE MOL. WT. 80.99
VOLUME 14.87 GAL/MIN  SP. GRAVITY 0.6703 (125.0 F)
VAPOR STREAM 54

| | | LBMOL/HR | MOL FR. |
|---|---|---|---|
| 1 $CO_2$ | | 79.542 | 0.9751 |

-continued

| | | | |
|---|---|---|---|
| 2 BP | 14–125 F | 2.000 | 0.0245 |
| 3 BP | 125–150 F | 0.022 | 0.271E-03 |
| 4 BP | 150–175 F | 0.005 | 0.624E-04 |
| 5 BP | 175–200 F | 0.001 | 0.128E-04 |
| 6 BP | 200–225 F | 0.000 | 0.218E-05 |
| 7 BP | 225–250 F | 0.000 | 0.329E-06 |
| 8 BP | 250–275 F | 0.000 | 0.465E-07 |
| 9 BP | 275–300 F | 0.000 | 0.512E-08 |
| 10 BP | 300–325 F | 0.000 | 0.514E-09 |
| 11 BP | 325–350 F | 0.000 | 0.468E-10 |
| 12 BP | 350–375 F | 0.000 | 0.382E-11 |
| 13 BP | 375–400 F | 0.000 | 0.286E-12 |
| 14 BP | 400–425 F | 0.000 | 0.193E-13 |
| 15 BP | 425–434 F | 0.000 | 0.103E-14 |
| | | 81.570 | |

TEMPERATURE 20.0 F   PRESSURE 204.00 PSIA
AVERAGE MOL. WT. 44.97
VOLUME 30.41 CFM
LIQUID STREAM 72

| | | LBMOL/HR | MOL FR. |
|---|---|---|---|
| 1 $CO_2$ | | 6.769 | 0.2886 |
| 2 BP | 14–125 F | 15.701 | 0.6695 |
| 3 BP | 125–150 F | 0.615 | 0.0262 |
| 4 BP | 150–175 F | 0.245 | 0.0104 |
| 5 BP | 175–200 F | 0.087 | 0.371E-02 |
| 6 BP | 200–225 F | 0.026 | 0.112E-02 |
| 7 BP | 225–250 F | 0.007 | 0.304E-03 |
| 8 BP | 250–275 F | 0.002 | 0.786E-04 |
| 9 BP | 275–300 F | 0.000 | 0.163E-04 |
| 10 BP | 300–325 F | 0.000 | 0.316E-05 |
| 11 BP | 325–350 F | 0.000 | 0.568E-06 |
| 12 BP | 350–375 F | 0.000 | 0.944E-07 |
| 13 BP | 375–400 F | 0.000 | 0.147E-07 |
| 14 BP | 400–425 F | 0.000 | 0.213E-08 |
| 15 BP | 425–434 F | 0.000 | 0.194E-09 |
| | | 23.453 | |

TEMPERATURE 20.0 F   PRESSURE 204.00 PSIA
AVERAGE MOL. WT. 71.89
VOLUME 4.54 GAL/MIN   SP. GRAVITY 0.7432 (125.0 F)
LIQUID STREAM 86

| | | LBMOL/HR | MOL FR. |
|---|---|---|---|
| 1 $CO_2$ | | 1.036 | 0.0146 |
| 2 BP | 14–125 F | 53.996 | 0.7599 |
| 3 BP | 125–150 F | 6.008 | 0.0846 |
| 4 BP | 150–175 F | 4.048 | 0.0570 |
| 5 BP | 175–200 F | 2.581 | 0.0363 |
| 6 BP | 200–225 F | 1.512 | 0.0213 |
| 7 BP | 225–250 F | 0.867 | 0.0122 |
| 8 BP | 250–275 F | 0.506 | 0.712E-02 |
| 9 BP | 275–300 F | 0.257 | 0.361E-02 |
| 10 BP | 300–325 F | 0.129 | 0.181E-02 |
| 11 BP | 325–350 F | 0.064 | 0.894E-03 |
| 12 BP | 350–375 F | 0.031 | 0.432E-03 |
| 13 BP | 375–400 F | 0.015 | 0.205E-03 |
| 14 BP | 400–425 F | 0.007 | 0.950E-04 |
| 15 BP | 425–434 F | 0.001 | 0.196E-04 |
| | | 71.056 | |

TEMPERATURE 125.0 F   PRESSURE 55.00 PSIA
AVERAGE MOL. WT. 86.44
VOLUME 18.30 GAL/MIN   SP. GRAVITY 0.6713 (125.0 F)
LIQUID STREAM 90

| | | LBMOL/HR | MOL FR. |
|---|---|---|---|
| 1 $CO_2$ | | 0.051 | 0.885E-03 |
| 2 BP | 14–125 F | 42.602 | 0.7360 |
| 3 BP | 125–150 F | 5.536 | 0.0956 |
| 4 BP | 150–175 F | 3.847 | 0.0665 |
| 5 BP | 175–200 F | 2.501 | 0.0432 |
| 6 BP | 200–225 F | 1.484 | 0.0256 |
| 7 BP | 225–250 F | 0.858 | 0.0148 |
| 8 BP | 250–275 F | 0.503 | 0.868E-02 |
| 9 BP | 275–300 F | 0.256 | 0.442E-02 |
| 10 BP | 300–325 F | 0.129 | 0.222E-02 |
| 11 BP | 325–350 F | 0.063 | 0.110E-02 |
| 12 BP | 350–375 F | 0.031 | 0.530E-03 |
| 13 BP | 375–400 F | 0.015 | 0.251E-03 |
| 14 BP | 400–425 F | 0.007 | 0.117E-03 |
| 15 BP | 425–434 F | 0.001 | 0.241E-04 |
| | | 57.883 | |

TEMPERATURE 79.7 F   PRESSURE 14.70 PSIA
AVERAGE MOL. WT. 87.81

-continued

VOLUME 14.61 GAL/MIN   SP. GRAVITY 0.6960 (79.7 F)
LIQUID STREAM 58

| | | LBMOL/HR | MOL FR. |
|---|---|---|---|
| 1 $CO_2$ | | 79.542 | 0.9751 |
| 2 BP | 14–125 F | 2.000 | 0.0245 |
| 3 BP | 125–150 F | 0.022 | 0.271E-03 |
| 4 BP | 150–175 F | 0.005 | 0.624E-04 |
| 5 BP | 175–200 F | 0.001 | 0.128E-04 |
| 6 BP | 200–225 F | 0.000 | 0.218E-05 |
| 7 BP | 225–250 F | 0.000 | 0.329E-06 |
| 8 BP | 250–275 F | 0.000 | 0.465E-07 |
| 9 BP | 275–300 F | 0.000 | 0.512E-08 |
| 10 BP | 300–325 F | 0.000 | 0.514E-09 |
| 11 BP | 325–350 F | 0.000 | 0.468E-10 |
| 12 BP | 350–375 F | 0.000 | 0.382E-11 |
| 13 BP | 375–400 F | 0.000 | 0.286E-12 |
| 14 BP | 400–425 F | 0.000 | 0.193E-13 |
| 15 BP | 425–434 F | 0.000 | 0.103E-14 |
| | | 81.570 | |

TEMPERATURE −2.4 F   PRESSURE 200.00 PSIA
AVERAGE MOL. WT. 44.97
VOLUME 6.85 GAL/MIN   SP. GRAVITY 1.0711 (−22.4 F)
SUMMARY OF COMPRESSOR POWER REQUIREMENTS

| | hp |
|---|---|
| First stage vapor compressor | 131.1 |
| Second stage vapor compressor | 139.3 |
| Refrigeration compressor | 200.0 |
| | 470.4 |

EXAMPLE 2—BENZENE LOADING

The benzene loading was simulated at a flow rate of 2,000 BPH.

Equipment operating specifications and conditions:
HOLDING TANK 212
TEMPERATURE = 100.0 F, PRESSURE = 14.70 PSIA
FIRST STAGE COMPRESSOR 224
GAS HORSEPOWER = 28.4
POLYTROPIC EFFICIENCY = 75.0%
INLET VOLUME = 207.2 CFM
INLET CONDITIONS

| STAGE | TEMP (F) | PRES (PSIA) |
|---|---|---|
| 1 | 99.9 | 14.70 |

OUTLET CONDITIONS

| TEMP (F) | PRES (PSIA) |
|---|---|
| 285.6 | 58.80 |

FIRST STAGE COOLER 228
TEMPERATURE = 125.0 F, PRESSURE = 55.00 PSIA
MOL FRACTION LIQUID = 0.13380
HEAT REMOVED = 0.120 MM BTU/HR
SECOND STAGE COMPRESSOR 236
GAS HORSEPOWER = 25.2
POLYTROPIC EFFICIENCY = 75.0%
INLET VOLUME = 50.2 CFM
INLET CONDITIONS

| STAGE | TEMP (F) | PRES (PSIA) |
|---|---|---|
| 1 | 124.7 | 55.0 |

OUTLET CONDITIONS

| TEMP (F) | PRES (PSIA) |
|---|---|
| 340.3 | 210.00 |

SECOND STAGE COOLER 238
TEMPERATURE = 125.0 F, PRESSURE = 207.00 PSIA
MOL FRACTION LIQUID = 0.08618
HEAT REMOVED = 97840.7 BTU/HR
FIRST STAGE CHILLER 248
TEMPERATURE = 45.0 F, PRESSURE = 204.00 PSIA
MOL FRACTION LIQUID = 0.03662
HEAT REMOVED = 30894.4 BTU/HR
KETTLE DRUM 274
TEMPERATURE = 100.0 F, PRESSURE = 55.00 PSIA
MOL FRACTION LIQUID = 0.94731
HEAT REMOVED = 1454.8 BTU/HR
SECOND STAGE CHILLER 256

-continued

TEMPERATURE = −23.4 F, PRESSURE = 200.00 PSIA
MOL FRACTION LIQUID = 1.00000
HEAT REMOVED = 0.157 MM BTU/HR

TOWER 288

COLUMN SUMMARY. FLOWS ARE IN LBMOL/HR

| STAGE | TEMP F | PRESS PSIA | FLOW FROM STAGE VAPOR | LIQUID |
|---|---|---|---|---|
| 5 | 92.3 | 14.70 | 6.7 | |
| 4 | 92.6 | 14.75 | 0.1 | 6.7 |
| 3 | 101.8 | 14.80 | 0.1 | 6.8 |
| 2 | 158.3 | 14.85 | 0.2 | 7.7 |
| 1 | 176.6 | 14.90 | 1.0 | |

| STAGE | FEED | PRODUCT | HT. ADDED MM BTU/HR |
|---|---|---|---|
| 5 | 6.9 | 0.3 VAP | |
| 4 | | | |
| 3 | | | |
| 2 | | | |
| 1 | | 6.6 LIQ | 0.019 |

Liquid/vapor stream conditions and compositions:

BENZENE STREAM 218

|  | MOL. FR. |
|---|---|
| 1 BENZENE | 1.0000 |

TEMPERATURE 100.0 F    PRESSURE 14.70 PSIA
AVERAGE MOL. WT. 78.11
VOLUME 2000 BPH

VAPOR STREAM 222

|  | LBMOL/HR | MOL FR. |
|---|---|---|
| 1 BENZENE | 6.744 | 0.2219 |
| 2 CARBON DIOXIDE | 23.644 | 0.7781 |
|  | 30.388 | |

TEMPERATURE 100.0 F    PRESSURE 14.70 PSIA
AVERAGE MOL. WT. 51.58
VOLUME 205.13 CFM

VAPOR STREAM 300

|  | LBMOL/HR | MOL FR. |
|---|---|---|
| 1 BENZENE | 0.058 | 0.1854 |
| 2 CARBON DIOXIDE | 0.255 | 0.8146 |
|  | 0.313 | |

TEMPERATURE 92.3 F    PRESSURE 14.70 PSIA
AVERAGE MOL. WT. 50.33
VOLUME 2.09 CFM

STREAM 226

|  | LBMOL/HR | MOL FR. |
|---|---|---|
| 1 BENZENE | 6.802 | 0.2216 |
| 2 CARBON DIOXIDE | 23.899 | 0.7784 |
|  | 30.701 | |

TEMPERATURE 285.6 F    PRESSURE 58.80 PSIA
AVERAGE MOL. WT. 51.57
VOLUME 68.65 CFM

VAPOR STREAM 234

|  | LBMOL/HR |
|---|---|
| 1 BENZENE | 2.816 |
| 2 CARBON DIOXIDE | 23.778 |
|  | 26.594 |

TEMPERATURE 125.0 F    PRESSURE 55.00 PSIA
AVERAGE MOL. WT. 47.62
VOLUME 49.54 CFM

LIQUID STREAM 268

|  | LBMOL/HR | MOL FR. |
|---|---|---|
| 1 BENZENE | 3.986 | 0.9705 |
| 2 CARBON DIOXIDE | 0.121 | 0.0295 |
|  | 4.108 | |

TEMPERATURE 125.0 F    PRESSURE 55.00 PSIA
AVERAGE MOL. WT. 77.11
VOLUME 0.74 GAL/MIN    SP. GRAVITY 0.8511 (125.0 F)

VAPOR STREAM 283

|  | LBMOL/HR | MOL FR. |
|---|---|---|
| 1 BENZENE | 0.024 | 0.0615 |
| 2 CARBON DIOXIDE | 0.363 | 0.9385 |
|  | 0.387 | |

TEMPERATURE 100.0 F    PRESSURE 55.00 PSIA
AVERAGE MOL. WT. 46.11
VOLUME 0.69 CFM

-continued

STREAM 240

|  | LBMOL/HR | MOL FR. |
|---|---|---|
| 1 BENZENE | 2.840 | 0.1053 |
| 2 CARBON DIOXIDE | 24.140 | 0.8947 |
|  | 26.980 | |

TEMPERATURE 340.3 F    PRESSURE 210.00 PSIA
AVERAGE MOL. WT. 47.60
VOLUME 17.94 CFM

VAPOR STREAM 246

|  | LBMOL/HR | MOL FR. |
|---|---|---|
| 1 BENZENE | 0.792 | 0.0321 |
| 2 CARBON DIOXIDE | 23.862 | 0.9679 |
|  | 24.655 | |

TEMPERATURE 125.0 F    PRESSURE 207.00 PSIA
AVERAGE MOL. WT. 45.11
VOLUME 11.69 CFM

LIQUID STREAM 270

|  | LBMOL/HR | MOL FR. |
|---|---|---|
| 1 BENZENE | 2.047 | 0.8805 |
| 2 CARBON DIOXIDE | 0.278 | 0.1195 |
|  | 2.325 | |

TEMPERATURE 125.0 F    PRESSURE 207.00 PSIA
AVERAGE MOL. WT. 74.04
VOLUME 0.40 GAL/MIN    SP. GRAVITY 0.8627 (125.0 F)
HEAT CAPACITY 0.4084
BTU/LB-F

VAPOR STREAM 254

|  | LBMOL/HR | MOL FR. |
|---|---|---|
| 1 BENZENE | 0.109 | 0.459E-02 |
| 2 CARBON DIOXIDE | 23.643 | 0.9954 |
|  | 23.752 | |

TEMPERATURE 45.0 F    PRESSURE 204.00 PSIA
AVERAGE MOL. WT. 44.17
VOLUME 9.55 CFM

LIQUID STREAM 272

|  | LBMOL/HR | MOL FR. |
|---|---|---|
| 1 BENZENE | 0.683 | 0.7569 |
| 2 CARBON DIOXIDE | 0.219 | 0.2431 |
|  | 0.903 | |

TEMPERATURE 45.0 F    PRESSURE 204.00 PSIA
AVERAGE MOL. WT. 69.82
VOLUME 0.13 GAL/MIN    SP. GRAVITY 0.9353 (45.0 F)

LIQUID STREAM 286

|  | LBMOL/HR | MOL FR. |
|---|---|---|
| 1 BENZENE | 6.691 | 0.9632 |
| 2 CARBON DIOXIDE | 0.256 | 0.0368 |
|  | 6.949 | |

TEMPERATURE 100.0 F    PRESSURE 55.00 PSIA
AVERAGE MOL. WT. 76.88
VOLUME 1.23 GAL/MIN    SP. GRAVITY 0.8670 (100.0 F)

LIQUID STREAM 258

|  | LBMOL/HR | MOL FR. |
|---|---|---|
| 1 BENZENE | 0.109 | 0.459E-02 |
| 2 CARBON DIOXIDE | 23.643 | 0.9954 |
|  | 23.752 | |

TEMPERATURE −23.4 F    PRESSURE 200.00 PSIA
AVERAGE MOL. WT. 44.17
VOLUME 1.95 GAL/MIN    SP. GRAVITY 1.0783 (−23.4 F)

LIQUID STREAM 304

|  | LBMOL/HR | MOL FR. |
|---|---|---|
| 1 BENZENE | 6.635 | 0.9999 |
| 2 CARBON DIOXIDE | 0.001 | 0.100E-03 |
|  | 6.636 | |

TEMPERATURE 176.6 F    PRESSURE 14.90 PSIA
AVERAGE MOL. WT. 78.11
VOLUME 1.27 GAL/MIN    SP. GRAVITY 0.8164 (176.6 F)

SUMMARY OF COMPRESSOR POWER REQUIREMENTS

|  | hp |
|---|---|
| First stage vapor compressor | 28.4 |
| Second stage vapor compressor | 25.2 |
| Refrigeration compressor | 44.0 |
|  | 97.6 |

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, what is claimed is:

1. A process for recovering vapors from a volatile liquid during loading of the liquid into a tank and for substantially reducing the presence of air in the tank during said loading, said process comprising the steps of:
   (a) providing an inert gas in the tank;
   (b) removing from the tank a vapor stream comprising a mixture of the inert gas and the volatile liquid vapors;
   (c) processing said removed vapor stream to separate said volatile liquid vapors from said inert gas;
   (d) recovering substantially all of the inert gas to substantially eliminate atmospheric discharge of said inert gas;
   (e) liquefying said recovered inert gas;
   (f) storing said liquefied inert gas for subsequent vaporization and return to the tank when the volatile liquid is unloaded therefrom;
   (g) recovering the volatile liquid vapor as a liquid; and
   (h) returning the recovered liquid to the tank.

2. The process of claim 1, wherein the step of supplying an inert gas comprises supplying an inert gas comprising carbon dioxide.

3. A process for recovering hydrocarbon vapors from a container during loading of the container with a liquid hydrocarbon and for substantially reducing the entry of air into the container during unloading of the liquid hydrocarbon from the container, said process comprising the steps of:
   supplying an inert gas to the container prior to or during filling of the container;
   withdrawing a mixture of the hydrocarbon vapors and inert gas from the container during or after the filling of the container;
   processing said mixture of hydrocarbon vapors and inert gas to separate the hydrocarbon vapors from the mixture; and
   recovering and storing the inert gas; and
   returning the recovered inert gas to the container as said liquid hydrocarbon is being unloaded from the container to substantially reduce the entry of air into the container.

4. The process of claim 3, including the step of recovering the hydrocarbon vapors as a liquid.

5. The process of claim 4, including the steps of liquefying said recovered inert gas and subsequently vaporizing the liquid inert gas for said return to the container.

6. The process of claim 5, including the step of returning said recovered hydrocarbon liquid to the container, whereby said process operates in a substantially closed cycle.

7. A process for loading a volatile liquid into a container and subsequently unloading the volatile liquid therefrom, said process comprising the steps of:
   (a) supplying an inert gas to the container;
   (b) loading the volatile liquid into the container whereby volatilized vapors from the liquid mix with the inert gas to form an inert vapor mixture;
   (c) removing the inert vapor mixture from the container;
   (d) processing the removed inert vapor mixture to separate the volatile liquid vapors from the inert gas;
   (e) subsequently unloading the volatile liquid from the container; and
   (f) directing said separated inert gas to the container as the volatile liquid is unloaded therefrom.

8. The process of claim 7, including the step of liquefying the separated volatilized vapors.

9. The process of claim 8, including the step of returning the liquefied volatilized vapors to the container.

10. The process of claim 7, including the steps of liquefying the separated inert gas and then vaporizing the liquefied inert gas prior to said step of directing the separated inert gas to the container.

11. The process of claim 10, including the steps of liquefying the separated volatilized vapors and directing the liquefied volatilized vapors to a second container.

12. The process of claim 10, wherein the step of supplying inert gas comprises supplying an inert gas comprising carbon dioxide.

13. The process of claim 3, wherein the step of supplying an inert gas comprises supplying an inert gas comprising carbon dioxide.

* * * * *